(12) United States Patent
Abe

(10) Patent No.: US 12,344,115 B2
(45) Date of Patent: Jul. 1, 2025

(54) SECONDARY BATTERY MANAGEMENT DEVICE, SECONDARY BATTERY MANAGEMENT METHOD, AND STORAGE MEDIUM

(71) Applicant: HONDA MOTOR CO., LTD., Tokyo (JP)

(72) Inventor: Noriyuki Abe, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 674 days.

(21) Appl. No.: 17/681,860

(22) Filed: Feb. 28, 2022

(65) Prior Publication Data

US 2022/0314830 A1  Oct. 6, 2022

(30) Foreign Application Priority Data

Mar. 31, 2021 (JP) .................................. 2021-062038

(51) Int. Cl.
*H02J 7/00* (2006.01)
*B60L 3/00* (2019.01)
(Continued)

(52) U.S. Cl.
CPC ............. *B60L 53/62* (2019.02); *B60L 3/0046* (2013.01); *B60L 53/305* (2019.02); *B60L 53/66* (2019.02); *B60L 58/13* (2019.02)

(58) Field of Classification Search
USPC ........................................................ 320/109
See application file for complete search history.

(56) References Cited

U.S. PATENT DOCUMENTS

| 7,884,569 B2 * | 2/2011 | Ward ........................ H02J 7/35 |
| | | 180/2.2 |
| 2011/0210698 A1 * | 9/2011 | Sakai ....................... H02J 7/04 |
| | | 320/109 |

(Continued)

FOREIGN PATENT DOCUMENTS

| CN | 111038286 | 4/2020 |
| JP | 08-070535 | 3/1996 |

(Continued)

OTHER PUBLICATIONS

CN103454589 English machine Translation (Year: 2013).*

(Continued)

*Primary Examiner* — Samuel Berhanu
(74) *Attorney, Agent, or Firm* — Amin, Turocy & Watson, LLP

(57) ABSTRACT

A secondary battery management device includes a target setting portion that sets a target charging rate that is a target for a charging rate of a secondary battery mounted in a vehicle, and a target charging rate reaching time that is a time when main charging in which the secondary battery is charged to the target charging rate at a main charging speed is completed; a main charging setting portion that sets a main charging start time when the main charging is started and the main charging speed on the basis of an output of a charger, the target charging rate, and the target charging rate reaching time; at least one of a discharging setting portion that sets a discharging start time when discharging of the secondary battery is started and a discharging speed that is a speed of the discharging, and a sub-charging setting portion that sets a sub-charging start time when sub-charging in which the secondary battery is charged at a sub-charging speed is started and the sub-charging speed; and a charging/discharging execution portion that executes the main charg- (Continued)

ing, the discharging, and the sub-charging in accordance with set details.

14 Claims, 5 Drawing Sheets

(51) Int. Cl.
    *B60L 53/30*     (2019.01)
    *B60L 53/62*     (2019.01)
    *B60L 53/66*     (2019.01)
    *B60L 58/13*     (2019.01)

(56) References Cited

U.S. PATENT DOCUMENTS

| | | |
|---|---|---|
| 2013/0024035 A1 | 1/2013 | Ito et al. |
| 2013/0187479 A1 | 7/2013 | Tsuchiya et al. |
| 2016/0276843 A1 | 9/2016 | Chang et al. |
| 2018/0201150 A1 | 7/2018 | Kubo et al. |
| 2020/0114775 A1 | 4/2020 | Tsurutani et al. |

FOREIGN PATENT DOCUMENTS

| | | |
|---|---|---|
| JP | 2012-139025 | 7/2012 |
| JP | 2013-027214 | 2/2013 |
| JP | 2013-106495 | 5/2013 |
| JP | 2014-158404 | 8/2014 |
| JP | 5672186 | 2/2015 |
| JP | 2016-178842 | 10/2016 |
| JP | 2017-184353 | 10/2017 |
| JP | 2017-208898 | 11/2017 |
| JP | 2018-117436 | 7/2018 |
| JP | 20019-170031 | 10/2019 |
| JP | 2021-035207 | 3/2021 |
| WO | 2012/070479 | 5/2012 |

OTHER PUBLICATIONS

Japanese Office Action for Japanese Patent Application No. 2021-062038 mailed Oct. 8, 2024.
Chinese Office Action for Chinese Patent Application No. 202210159262.7 mailed Mar. 5, 2025.

* cited by examiner

SECONDARY BATTERY MANAGEMENT DEVICE, SECONDARY BATTERY MANAGEMENT METHOD, AND STORAGE MEDIUM

CROSS-REFERENCE TO RELATED APPLICATION

This application is based upon and claims the benefit of priority from Japanese Patent Application No. 2021-062038, filed Mar. 31, 2021, the entire contents of which is incorporated herein by reference.

BACKGROUND OF THE INVENTION

Field of the Invention

The present invention relates to a secondary battery management device, a secondary battery management method, and a storage medium.

Description of Related Art

Recently, vehicles powered by a motor which is driven utilizing electricity supplied from a secondary battery, for example, electric vehicles (EV), hybrid vehicles (HV), and fuel cell vehicles (FCV) have become widespread. Secondary batteries mounted in these vehicles perform self-discharging without being charged after they have been fully charged once. For this reason, in the secondary battery described above, the charging rate continuously decreases, and thus sufficient electricity may not be able to be supplied to the vehicle when the vehicle is used.

Examples of a technology for resolving such problems include the electricity supply system disclosed in Japanese Patent No. 5672186. The electricity supply system controls a storage battery of a power storage unit provided outside a vehicle and charge/discharge electricity of an in-vehicle storage battery of an in-vehicle power storage device in accordance with a charging/discharging schedule.

SUMMARY OF THE INVENTION

However, the electricity supply system described above may require a storage battery of a power storage unit provided outside the vehicle in order to supply sufficient electricity to the vehicle when the vehicle is used while curbing deterioration of the in-vehicle storage battery due to a high charging rate. For this reason, in the electricity supply system, when the storage battery of the power storage unit cannot be used, both the durability of the in-vehicle storage battery and the convenience of the vehicle may not be able to be achieved.

Aspects according to the present invention have been made in consideration of such circumstances, and an object thereof is to provide a secondary battery management device, a secondary battery management method, and a storage medium, in which both durability of a secondary battery used for the purpose of causing a vehicle to travel and convenience of the vehicle can be easily achieved.

In order to resolve the foregoing problems and achieve the object, the present invention employs the following aspects.

(1): A secondary battery management device according to an aspect of the present invention includes a target setting portion that sets a target charging rate that is a target for a charging rate of a secondary battery used for the purpose of causing a vehicle to travel and a target charging rate reaching time that is a time when main charging in which the secondary battery is charged to the target charging rate at a main charging speed is completed; a main charging setting portion that sets a main charging start time that is a time when the main charging is started and the main charging speed on the basis of an output of a charger for charging the secondary battery, the target charging rate, and the target charging rate reaching time; at least one of a discharging setting portion that sets a discharging start time that is a time when discharging of the secondary battery is started and a discharging speed that is a speed of the discharging, and a sub-charging setting portion that sets a sub-charging start time that is a time when sub-charging in which the secondary battery is charged at a sub-charging speed is started and the sub-charging speed; and a charging/discharging execution portion that executes the main charging in accordance with details set by the main charging setting portion, executes the discharging in accordance with details set by the discharging setting portion, and executes the sub-charging in accordance with details set by the sub-charging setting portion.

(2): According to the foregoing aspect of (1), the sub-charging setting portion may be set such that the sub-charging is executed before the main charging start time.

(3): According to the foregoing aspect of (1) or (2), the discharging setting portion may be set such that the discharging is executed before the main charging start time.

(4): According to any one of the foregoing aspects of (1) to (3), the discharging setting portion may be set such that the discharging is executed after the main charging start time.

(5): According to any one of the foregoing aspects of (1) to (4), the secondary battery management device may further include a tendency data acquiring portion that acquires tendency data indicating tendencies in scheduling of the vehicle being used. The main charging setting portion may calculate a quantity of electricity allowed for main charging that is a quantity of electricity allowed for the main charging with respect to the secondary battery on the basis of the tendency data and may set the main charging start time and the main charging speed on the basis of the quantity of electricity allowed for main charging. The sub-charging setting portion may calculate a quantity of electricity allowed for sub-charging that is a quantity of electricity allowed for the sub-charging with respect to the secondary battery on the basis of the tendency data and may set the sub-charging start time and the sub-charging speed on the basis of the quantity of electricity allowed for sub-charging.

(6): According to the foregoing aspect of (5), the discharging setting portion may calculate a quantity of electricity allowed for discharging that is a quantity of electricity allowed for the discharging on the basis of the quantity of electricity allowed for main charging and the quantity of electricity allowed for sub-charging and may set the discharging start time and the discharging speed on the basis of the quantity of electricity allowed for discharging.

(7): According to the foregoing aspect of (5) or (6), the tendency data acquiring portion may acquire the tendency data indicating a first period that is a period during which the vehicle is not used for traveling, a second period that is a period during which the vehicle is used for traveling and which is subsequent to the first period, and a third period that is a period during which the vehicle is not used for traveling and which is subsequent to the second period. The target setting portion may set the target charging rate reaching time to an end of the first period and may set the target charging rate to a charging rate equal to or higher than a charging rate required for the vehicle to travel during the second period.

(8): According to the foregoing aspect of (5) or (6), the tendency data acquiring portion may acquire the tendency data indicating a first period that is a period during which the vehicle is not used for traveling, a second period that is a period during which the vehicle is used for traveling and which is subsequent to the first period, and a third period that is a period during which the vehicle is not used for traveling and which is subsequent to the second period. The target setting portion may set the target charging rate to a charging rate equal to or higher than a predetermined charging rate and may set the target charging rate reaching time to an end of the third period.

(9): According to any one of the foregoing aspects of (1) to (8), the secondary battery management device may further include a judging portion that judges whether or not anyone is present inside a compartment of the vehicle. The discharging setting portion may perform setting such that the discharging is prohibited when it is judged that someone is present inside the compartment of the vehicle.

(10): According to the foregoing aspect of (9), the discharging setting portion may cancel setting for prohibiting discharging of the secondary battery when the charging rate of the secondary battery exceeds a predetermined threshold after the discharging is prohibited.

(11): According to any one of the foregoing aspects of (1) to (10), the discharging setting portion may perform setting such that electricity output from the secondary battery through the discharging is utilized for at least one of warming of the secondary battery, cooling of the secondary battery, air conditioning inside the compartment of the vehicle, and heating of oil of the vehicle.

(12): According to any one of the foregoing aspects of (1) to (10), electricity generated by a solar power generation panel may be accumulated in the secondary battery. The main charging setting portion may execute processing of setting the main charging start time and the main charging speed at least once on the basis of changes in amount of electricity generated by the solar power generation panel.

(13): According to the foregoing aspect of (12), the solar power generation panel may be mounted in the vehicle.

(14): A computer readable non-transitory storage medium according to another aspect of the present invention stores a secondary battery management program for causing a computer to execute a target setting function of setting a target charging rate that is a target for a charging rate of a secondary battery used for the purpose of causing a vehicle to travel and a target charging rate reaching time that is a time when main charging in which the secondary battery is charged to the target charging rate at a main charging speed is completed; a main charging setting function of setting a main charging start time that is a time when the main charging is started and the main charging speed on the basis of an output of a charger for charging the secondary battery, the target charging rate, and the target charging rate reaching time; at least one of a discharging setting function of setting a discharging start time that is a time when discharging of the secondary battery is started and a discharging speed that is a speed of the discharging, and a sub-charging setting function of setting a sub-charging start time that is a time when sub-charging in which the secondary battery is charged at a sub-charging speed is started and the sub-charging speed; and a charging/discharging execution function of executing the main charging in accordance with details set by the main charging setting portion, executing the discharging in accordance with details set by the discharging setting portion, and executing the sub-charging in accordance with details set by the sub-charging setting portion.

(15): In a secondary battery management method according to another aspect of the present invention, a computer sets a target charging rate that is a target for a charging rate of a secondary battery used for the purpose of causing a vehicle to travel and a target charging rate reaching time that is a time when main charging in which the secondary battery is charged to the target charging rate at a main charging speed is completed; sets a main charging start time that is a time when the main charging is started and the main charging speed on the basis of an output of a charger for charging the secondary battery, the target charging rate, and the target charging rate reaching time; executes at least one of processing of setting a discharging start time that is a time when discharging of the secondary battery is started and a discharging speed that is a speed of the discharging, and processing of setting a sub-charging start time that is a time when sub-charging in which the secondary battery is charged at a sub-charging speed is started and the sub-charging speed; and executes the main charging in accordance with details set by the main charging setting portion, executes the discharging in accordance with details set by the discharging setting portion, and executes the sub-charging in accordance with details set by the sub-charging setting portion.

According to (1) to (13), in the secondary battery management device, at least one of processing of decreasing the charging rate of the secondary battery by executing the discharging and processing of comparatively gently raising the charging rate of the secondary battery by executing the sub-charging, and processing of comparatively quickly raising the charging rate of the secondary battery by executing the main charging are used together. Accordingly, in the secondary battery management device, while an average charging rate during a period from the earliest time of the main charging start time, the sub-charging start time, and the discharging start time to the target charging rate reaching time is maintained at a comparatively low charging rate, the charging rate of the secondary battery at the target charging rate reaching time is adopted as the target charging rate. Therefore, in the secondary battery management device, while deterioration of the secondary battery mounted in the vehicle is curbed, the charging rate of the secondary battery when the vehicle is used can meet a desired charging rate.

According to (2), in the secondary battery management device, the sub-charging is executed as preparation before the main charging is executed. Accordingly, in the secondary battery management device, while the average charging rate during a period from the sub-charging start time to the target charging rate reaching time is maintained at a comparatively low charging rate, preparation for adopting the charging rate of the secondary battery at the target charging rate reaching time as the target charging rate can be arranged.

According to (3), in the secondary battery management device, the secondary battery is caused to execute the discharging before the main charging is executed. Accordingly, in the secondary battery management device, while the average charging rate during a period from the discharging start time to the target charging rate reaching time is maintained at a comparatively low charging rate, preparation for adopting the charging rate of the secondary battery at the target charging rate reaching time as the target charging rate can be arranged.

According to (4), in the secondary battery management device, the discharging is executed after the main charging start time. Accordingly, in the secondary battery management device, the charging rate of the secondary battery can be raised in accordance with the period from the main charging start time to the target charging rate reaching time, and the charging rate of the secondary battery at the target charging rate reaching time can be adopted as the target charging rate.

According to (5), in the secondary battery management device, the main charging start time, the main charging speed, the sub-charging start time, and the sub-charging speed are set on the basis of the tendency data indicating tendencies in scheduling of the vehicle being used. Accordingly, in the secondary battery management device, the main charging and the sub-charging can be executed in accordance with the tendencies in scheduling of the vehicle being used.

According to (6), in the secondary battery management device, the discharging start time and the discharging speed are set on the basis of the quantity of electricity allowed for discharging which is calculated on the basis of the quantity of electricity allowed for main charging and the quantity of electricity allowed for sub-charging. Accordingly, the discharging can be executed in the secondary battery management device, in accordance with the tendencies in scheduling of the vehicle being used.

According to (7), in the secondary battery management device, the target charging rate reaching time is set at the end of the first period, and the target charging rate is set to a charging rate equal to or higher than a charging rate required for the vehicle to travel during the second period. Accordingly, in the secondary battery management device, when the vehicle is used during the second period, the secondary battery can be in a state in which sufficient electricity can be supplied to the vehicle.

According to (8), in the secondary battery management device, the target charging rate reaching time is set at the end of the third period. Accordingly, in the secondary battery management device, when the second period between the first period that is a period during which the vehicle is not used for traveling and the third period is comparatively short, the processing described above can be executed regardless of the second period, and the secondary battery can be in a state in which sufficient electricity can be supplied to the vehicle at the end of the third period.

According to (9), in the secondary battery management device, setting is performed such that the discharging is prohibited when it is judged that someone is present inside the compartment of the vehicle. Accordingly, in the secondary battery management device, a situation in which a person inside the compartment of the vehicle cannot use in-vehicle instruments operated by utilizing electricity of the secondary battery can be avoided.

According to (10), in the secondary battery management device, even if there is a likelihood that a person inside the compartment of the vehicle will use in-vehicle instruments operated by utilizing electricity of the secondary battery, when the charging rate of the secondary battery is sufficiently high, the charging rate of the secondary battery can be decreased by suitably executing the discharging, and deterioration of the secondary battery can be curbed.

According to (11), in the secondary battery management device, setting is performed such that electricity output from the secondary battery through the discharging is utilized for at least one of warming of the secondary battery, cooling of the secondary battery, air conditioning inside the compartment of the vehicle, and heating of oil of the vehicle. Accordingly, in the secondary battery management device, electricity output from the secondary battery through the discharging can be effectively utilized.

According to (12) and (13), in the secondary battery management device, processing of setting the main charging start time and the main charging speed is executed at least once on the basis of changes in amount of electricity generated by the solar power generation panel. Accordingly, in the secondary battery management device, even if there is a likelihood that electricity generated by the solar power generation panel will fluctuate due to climate change or the like, the main charging start time and the main charging speed can be suitably revised on the basis of results of electricity generated by the solar power generation panel.

According to (14), in the storage medium, at least one of processing of decreasing the charging rate of the secondary battery by executing the discharging and processing of comparatively gently raising the charging rate of the secondary battery by executing the sub-charging, and processing of comparatively quickly raising the charging rate of the secondary battery by executing the main charging are used together. Accordingly, in the storage medium, while an average charging rate during a period from the earliest time of the main charging start time, the sub-charging start time, and the discharging start time to the target charging rate reaching time is maintained at a comparatively low charging rate, the charging rate of the secondary battery at the target charging rate reaching time is adopted as the target charging rate. Therefore, in the storage medium, while deterioration of the secondary battery mounted in the vehicle is curbed, the charging rate of the secondary battery when the vehicle is used can meet a desired charging rate.

According to (15), in the secondary battery management method, at least one of processing of decreasing the charging rate of the secondary battery by executing the discharging and processing of comparatively gently raising the charging rate of the secondary battery by executing the sub-charging, and processing of comparatively quickly raising the charging rate of the secondary battery by executing the main charging are used together. Accordingly, in the secondary battery management method, while an average charging rate during a period from the earliest time of the main charging start time, the sub-charging start time, and the discharging start time to the target charging rate reaching time is maintained at a comparatively low charging rate, the charging rate of the secondary battery at the target charging rate reaching time is adopted as the target charging rate. Therefore, in the secondary battery management method, while deterioration of the secondary battery mounted in the vehicle is curbed, the charging rate of the secondary battery when the vehicle is used can meet a desired charging rate.

DETAILED DESCRIPTION OF THE INVENTION

Hereinafter, with reference to the drawings, an embodiment of a secondary battery management device, a secondary battery management program, a secondary battery management method, and a storage medium according to the present invention will be described.

Embodiment

Figure 1:
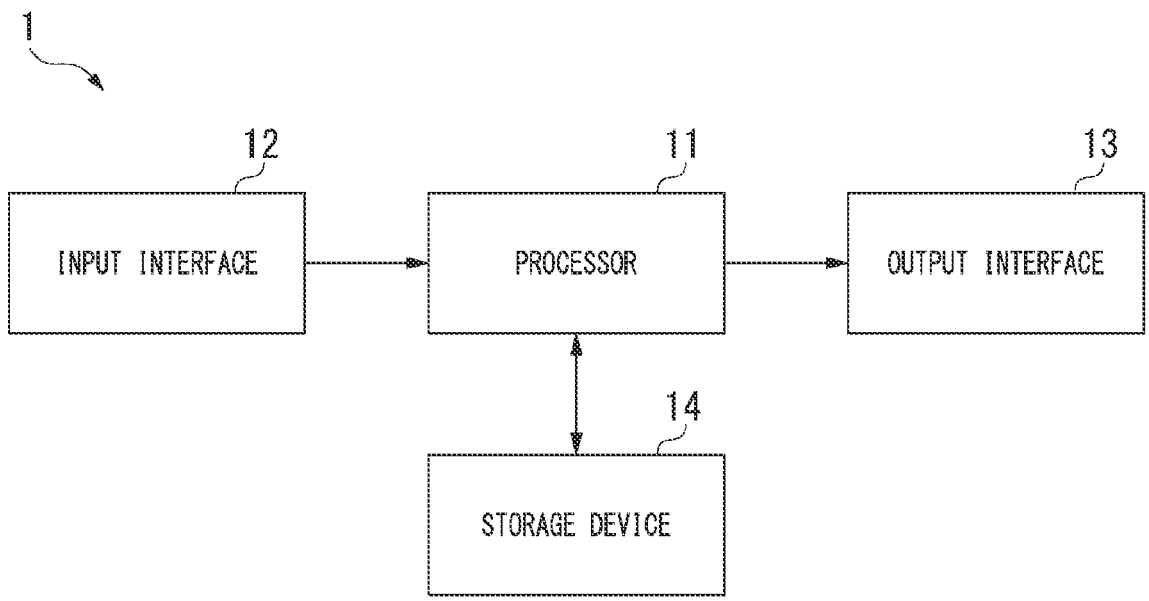
FIG. 1 is a view illustrating an example of a hardware constitution of a secondary battery management device according to an embodiment.

First, a hardware constitution of a secondary battery management device according to the embodiment will be described with reference to FIG. 1. FIG. 1 is a view illustrating an example of the hardware constitution of the secondary battery management device according to the embodiment. For example, a secondary battery management device 1 illustrated in FIG. 1 is an electronic control unit (ECU) mounted in a vehicle. For example, as illustrated in FIG. 1, the secondary battery management device 1 includes a processor 11, an input interface 12, an output interface 13, and a storage device 14.

For example, the processor 11 is a central processing unit (CPU), which reads and executes a secondary battery management program which will be described below and realizes each of the functions provided in the secondary battery management device 1. The processor 11 may realize each of the functions provided in the vehicle by reading and executing a program other than the secondary battery management program.

The input interface 12 is an interface circuit for receiving data from electronic control units other than the secondary battery management device 1, sensors mounted in the vehicle, and the like. The input interface 12 receives data transmitted via a controller area network (CAN), a local interconnect network (LIN), or the like.

The output interface 13 is an interface circuit for transmitting data indicating results computed by the processor 11 on the basis of data received by the input interface 12. The output interface 13 transmits data transmitted via the CAN, the LIN, or the like.

For example, the storage device 14 is a random access memory (RAM), and the secondary battery management program and other programs to be read and executed by the processor 11 are stored therein in advance. The storage device 14 may have a storage domain in which data indicating results computed by the processor 11 is stored.

Figure 2:
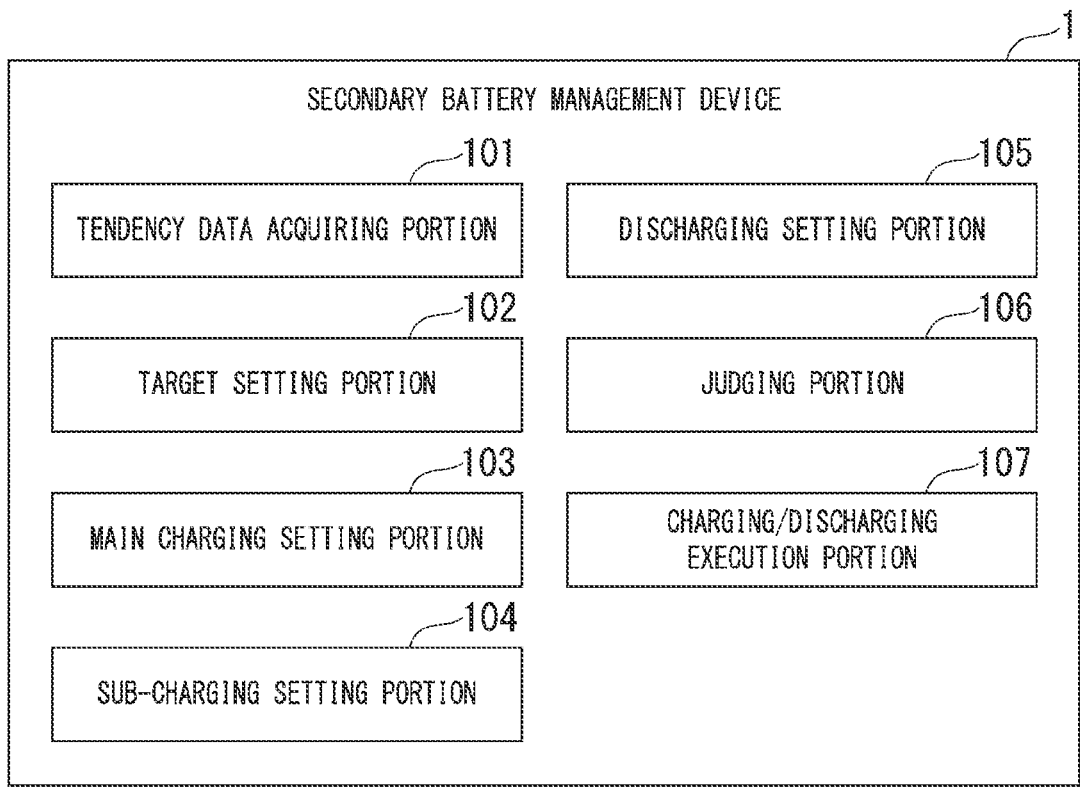
FIG. 2 is a view illustrating an example of a software constitution of the secondary battery management device according to the embodiment.

Next, a software constitution of the secondary battery management device according to the embodiment will be described with reference to FIG. 2. FIG. 2 is a view illustrating an example of the software constitution of the secondary battery management device according to the embodiment. The secondary battery management device 1 is mounted in a vehicle, for example, an electric vehicle, a hybrid vehicle, a fuel cell vehicle, or a vehicle in which a solar power generation panel is mounted. As illustrated in FIG. 2, the secondary battery management device 1 includes a tendency data acquiring portion 101, a target setting portion 102, a main charging setting portion 103, a sub-charging setting portion 104, a discharging setting portion 105, a judging portion 106, and a charging/discharging execution portion 107.

At least some of the functions provided in the secondary battery management device 1 are realized by the processor 11 (hardware) executing the secondary battery management program (software), for example. At least some of the functions provided in the secondary battery management device 1 may be realized by hardware (a circuit; including circuitry) such as a large scale integration (LSI), an application specific integrated circuit (ASIC), a field-programmable gate array (FPGA), or a graphics processing unit (GPU) or may be realized by software and hardware in cooperation.

The tendency data acquiring portion 101 acquires tendency data. The tendency data is data indicating tendencies in scheduling of the vehicle being used. The tendency data indicates tendencies such as time periods during which the vehicle is used for traveling, time periods during which the vehicle is not used for traveling, places where the vehicle has been located, and the like. For example, the tendency data may indicate these tendencies according to days, seasons, or areas.

The target setting portion 102 sets a target charging rate that is a target for a charging rate of a secondary battery used for the purpose of causing the vehicle to travel, and a target charging rate reaching time that is a time when main charging in which the secondary battery is charged to the target charging rate at a main charging speed is completed. The aforementioned secondary battery is a lithium-ion battery, for example.

For example, the target charging rate is set on the basis of at least one of a distance over which the vehicle is predicted to travel, air-conditioning which is mounted in the vehicle, and a time for which an in-vehicle instrument such as an audio is predicted to be used, which are indicated by the tendency data. Alternatively, when a solar power generation panel for supplying electricity to the secondary battery is mounted in the vehicle, the target charging rate may be set on the basis of the climate in a place where the vehicle is predicted to be located. For example, the target charging rate reaching time is set to a time when the vehicle is predicted to start traveling, which is indicated by the tendency data.

The main charging setting portion 103 sets parameters related to the main charging in which the secondary battery is charged at a speed higher than that in sub-charging. Specifically, the main charging setting portion 103 sets a main charging start time that is a time when the main charging is started and the main charging speed on the basis of an output of a charger for charging the secondary battery, the target charging rate, and the target charging rate reaching time. That is, the main charging setting portion 103 sets the main charging start time and the main charging speed such that the charging rate of the secondary battery reaches the target charging rate at the target charging rate reaching time within a range of the output of the charger. Moreover, the main charging is a charging method for charging the secondary battery at a comparatively high speed. Therefore, the main charging setting portion 103 often sets the main charging start time and the main charging speed on the premise that the output of the charger is increased to an output at a certain level or higher.

The main charging setting portion 103 may calculate a quantity of electricity allowed for main charging that is a quantity of electricity allowed for the main charging with respect to the secondary battery on the basis of the tendency data and may set the main charging start time and the main charging speed on the basis of the quantity of electricity allowed for main charging. For example, in a case of a vehicle in which a solar power generation panel for supplying electricity to the secondary battery is not mounted, the quantity of electricity allowed for main charging becomes a quantity of electricity calculated as the product of the time at night or the like during which the vehicle is not used for traveling and the output of the charger. Alternatively, in a case of a vehicle in which a solar power generation panel for supplying electricity to the secondary battery is mounted, the quantity of electricity allowed for main charging becomes a quantity of electricity obtained by subtracting a quantity of electricity required for the vehicle to travel to a destination from a quantity of electricity which can be generated by the solar power generation panel during the daytime or the like.

In a case of a vehicle in which a solar power generation panel for supplying electricity to the secondary battery is mounted, the main charging setting portion 103 may execute processing of setting the main charging start time and the main charging speed at least once on the basis of changes in amount of electricity generated by the solar power generation panel. This processing is executed for the purpose of revising the main charging start time and the main charging speed in accordance with the circumstances when the electricity generated by the solar power generation panel changes due to climate change or the like.

The sub-charging setting portion 104 sets parameters related to the sub-charging for charging the secondary battery at a speed lower than that in the main charging. Specifically, the sub-charging setting portion 104 sets a sub-charging start time that is a time when the sub-charging in which the secondary battery is charged at a sub-charging speed is started, and the sub-charging speed. Moreover, the sub-charging is a charging method performed as preparation for charging the secondary battery at a comparatively low speed, adjusting the charging rate of the secondary battery, and causing the charging rate of the secondary battery to reach the target charging rate at the target charging rate reaching time through the main charging. Therefore, the sub-charging setting portion 104 often sets the sub-charging start time and the sub-charging speed on the premise that the output of the charger is regulated to an output at a certain level or lower. The sub-charging setting portion 104 may perform setting such that the sub-charging is executed before the main charging start time.

The sub-charging setting portion 104 may calculate a quantity of electricity allowed for sub-charging that is a quantity of electricity allowed for the sub-charging with respect to the secondary battery on the basis of the tendency data and may set the sub-charging start time and the sub-charging speed on the basis of the quantity of electricity allowed for sub-charging. For example, in a case of a vehicle in which a solar power generation panel for supplying electricity to the secondary battery is not mounted, the quantity of electricity allowed for sub-charging becomes a quantity of electricity calculated as the product of the time at night or the like during which the vehicle is not used for traveling and the output of the charger. Alternatively, in a case of a vehicle in which a solar power generation panel for supplying electricity to the secondary battery is mounted, the quantity of electricity allowed for sub-charging becomes a quantity of electricity obtained by subtracting a quantity of electricity required for the vehicle to travel to a destination from a quantity of electricity which can be generated by the solar power generation panel during the daytime or the like.

The discharging setting portion 105 sets parameters related to discharging of the secondary battery. The discharging is an operation of arranging preparation for outputting electricity to the secondary battery, adjusting the charging rate of the secondary battery, and causing the charging rate of the secondary battery to reach the target charging rate at the target charging rate reaching time through the main charging. The discharging setting portion 105 sets a discharging start time that is a time when the discharging of the secondary battery is started and a discharging speed that is a speed of the discharging. For example, the discharging setting portion 105 calculates a quantity of electricity allowed for discharging that is a quantity of electricity allowed for the discharging on the basis of the quantity of electricity allowed for main charging and the quantity of electricity allowed for sub-charging and sets the discharging start time and the discharging speed on the basis of the quantity of electricity allowed for discharging.

The discharging setting portion 105 may perform setting such that the discharging is executed before the main charging start time. Alternatively, the discharging setting portion 105 may perform setting such that the discharging is executed after the main charging start time.

The discharging setting portion 105 may perform setting such that electricity output from the secondary battery through the discharging is utilized for at least one of warming of the secondary battery, cooling of the secondary battery, air conditioning inside a compartment of the vehicle, and heating of oil of the vehicle.

The judging portion 106 judges whether or not anyone is present inside the compartment of the vehicle. For example, the judging portion 106 judges whether or not anyone is present inside the compartment of the vehicle using human detection sensors mounted in the vehicle. Examples of a human detection sensor include seat sensors attached to seats in the vehicle. Alternatively, the judging portion 106 is mounted in the vehicle and judges whether or not a figure of a person is depicted by applying deep learning to still images or video images imaged by a camera imaging the inside of the compartment of the vehicle. Alternatively, the judging portion 106 judges whether or not anyone is present inside the compartment of the vehicle by detecting whether or not a car navigation system, a seatbelt, or the like mounted in the vehicle is operated.

When the judging portion 106 judges that someone is present inside the compartment of the vehicle, the discharging setting portion 105 may perform setting such that the discharging is prohibited. Moreover, when the charging rate of the secondary battery exceeds a predetermined threshold after the discharging is prohibited, the discharging setting portion 105 may cancel setting for prohibiting the discharging of the secondary battery.

The charging/discharging execution portion 107 causes the charger connected to the vehicle through a charging cable to execute the main charging in accordance with details set by the main charging setting portion 103. The charging/discharging execution portion 107 executes the discharging in accordance with details set by the discharging setting portion 105. Moreover, the charging/discharging execution portion 107 causes the charger connected to the vehicle through the charging cable to execute the sub-charging in accordance with details set by the sub-charging setting portion 104.

Figure 3:
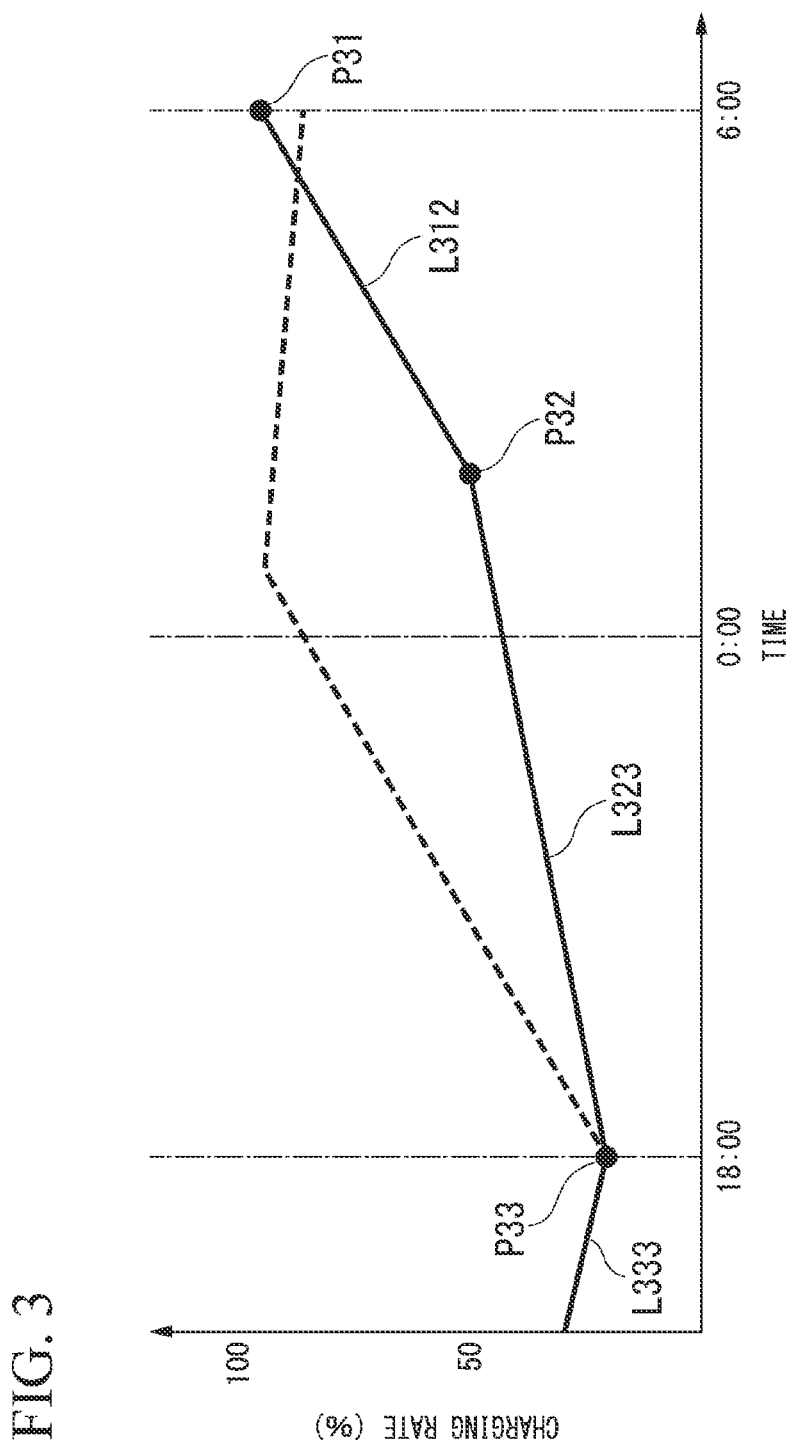
FIG. 3 is a view illustrating an example of scheduling in which a charging rate of a secondary battery changes over time when setting is performed such that sub-charging is executed before a main charging start time, and scheduling in which the charging rate of the secondary battery according to a first comparative example changes over time.

Next, a first example of scheduling in which the charging rate of the secondary battery according to the embodiment changes over time will be described with reference to FIG. 3. FIG. 3 is a view illustrating an example of scheduling in which the charging rate of the secondary battery changes over time when setting is performed such that the sub-charging is executed before the main charging start time, and scheduling in which the charging rate of the secondary battery according to a first comparative example changes over time. FIG. 3 illustrates an example of a case in which a user comes home using the vehicle at 18:00 in the evening, the vehicle is brought to a stop in a garage at home during a period from 18:00 to 6:00 on the next day, and the user goes to work using the vehicle at 6:00. In FIG. 3, the horizontal axis indicates the time, and the vertical axis indicates the charging rate.

In FIG. 3, an example of scheduling in which the charging rate of the secondary battery according to the first comparative example changes over time is indicated by the dotted line. In the secondary battery management device according to the first comparative example, as indicated by the dotted line in FIG. 3, charging is stopped after the charging is executed until after 0:00, and the secondary battery is caused to perform self-discharging up to 6:00.

On the other hand, in FIG. 3, an example of scheduling in which the charging rate of the secondary battery changes over time when setting is performed such that the sub-charging is executed before the main charging start time is indicated by the solid line. The solid line indicated in FIG. 3 is constituted of a point P31, a point P32, a point P33, a segment L312, and a segment L323.

The coordinate on the horizontal axis of the point P31 indicates 6:00 that is an example of the target charging rate reaching time. The coordinate on the vertical axis of the point P31 indicates 95% that is an example of the target charging rate. The coordinates of the point P31 are set by the target setting portion 102.

The coordinate on the horizontal axis of the point P32 indicates the main charging start time. The coordinate on the vertical axis of the point P32 indicates the charging rate of the secondary battery at the main charging start time, at which the sub-charging is completed. In the segment L312, one end coincides with the point P31, and the other end coincides with the point P32. The inclination of the segment L312 indicates the main charging speed. The coordinate on the horizontal axis of the point P33 indicates 18:00 that is an example of the sub-charging start time. The coordinate on the vertical axis of the point P33 indicates the charging rate of the secondary battery at a point of time when the vehicle has finished traveling.

In the segment L323, one end coincides with the point P32, and the other end coincides with the point P33. The inclination of the segment L323 indicates the sub-charging speed. Therefore, the coordinates of the point P32 are determined by the target charging rate reaching time and the target charging rate set by the target setting portion 102, the main charging start time and the main charging speed set by the main charging setting portion 103, the sub-charging start time set by the sub-charging setting portion 104, and the charging rate of the secondary battery at the point of time when the vehicle has finished traveling. A segment L333 indicates an example of change in the charging rate of the secondary battery over time while the vehicle is traveling.

In this case, the charging/discharging execution portion 107 causes the charger to execute the sub-charging as indicated by the segment L323 in FIG. 3 and causes the charger to execute the main charging as indicated by the segment L312 in FIG. 3. Accordingly, the charging/discharging execution portion 107 can further decrease the average value of the charging rates of the secondary battery during a period from 18:00 to 6:00 on the next day than that in the secondary battery management device according to the first comparative example.

Figure 4:
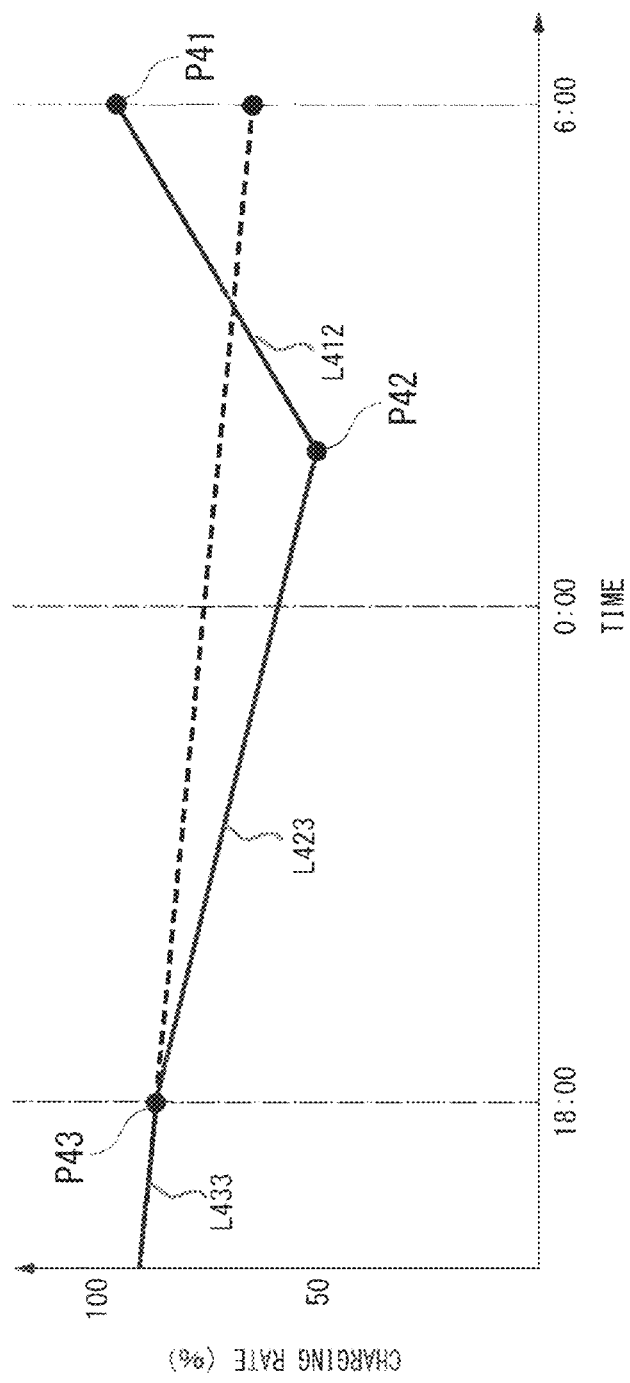
FIG. 4 is a view illustrating an example of scheduling in which the charging rate of the secondary battery changes over time when setting is performed such that discharging is executed before the main charging start time, and scheduling in which the charging rate of the secondary battery according to a second comparative example changes over time.

Next, a second example of scheduling in which the charging rate of the secondary battery according to the embodiment changes over time will be described with reference to FIG. 4. FIG. 4 is a view illustrating an example of scheduling in which the charging rate of the secondary battery changes over time when setting is performed such that the discharging is executed before the main charging start time, and scheduling in which the charging rate of the secondary battery according to a second comparative example changes over time. FIG. 4 illustrates an example of a case in which the vehicle is brought to a stop in the garage at home during a period from before 18:00 in the evening of a holiday to 6:00 on the next day, and the user goes to work using the vehicle at 6:00. In FIG. 4, the horizontal axis indicates the time, and the vertical axis indicates the charging rate.

In FIG. 4, an example of scheduling in which the charging rate of the secondary battery according to the second comparative example changes over time is indicated by the dotted line. In the secondary battery management device according to the second comparative example, as indicated by the dotted line in FIG. 4, the secondary battery is caused to perform self-discharging from before 18:00 to 6:00.

On the other hand, in FIG. 4, an example of scheduling in which the charging rate of the secondary battery changes over time when setting is performed such that the discharging is executed before the main charging start time is indicated by the solid line. The solid line indicated in FIG. 4 is constituted of a point P41, a point P42, a point P43, a segment L412, and a segment L423.

The coordinate on the horizontal axis of the point P41 indicates 6:00 that is an example of the target charging rate reaching time. The coordinate on the vertical axis of the point P41 indicates 95% that is an example of the target charging rate. The coordinates of the point P41 are set by the target setting portion 102.

The coordinate on the horizontal axis of the point P42 indicates the main charging start time. The coordinate on the vertical axis of the point P42 indicates the charging rate of the secondary battery at the main charging start time, at which the discharging is completed. In the segment L412, one end coincides with the point P41, and the other end coincides with the point P42. The inclination of the segment L412 indicates the main charging speed. The coordinate on the horizontal axis of the point P43 indicates 18:00 that is an example of the discharging start time. The coordinate on the vertical axis of the point P43 indicates the charging rate of the secondary battery at the discharging start time.

In the segment L423, one end coincides with the point P42, and the other end coincides with the point P43. The inclination of the segment L423 indicates the discharging speed. Therefore, the coordinates of the point P42 are determined by the target charging rate reaching time and the target charging rate set by the target setting portion 102, the main charging start time and the main charging speed set by the main charging setting portion 103, the discharging start time set by the discharging setting portion 105, and the charging rate of the secondary battery at the discharging start time. A segment L433 indicates an example of change in the charging rate over time due to self-discharging of the secondary battery while the vehicle is brought to a stop.

In this case, the charging/discharging execution portion 107 causes the charger to execute the discharging as indicated by the segment L423 in FIG. 4 and causes the charger to execute the main charging as indicated by the segment L412 in FIG. 4. Accordingly, the charging/discharging execution portion 107 can further decrease the average value of the charging rates of the secondary battery during a period from 18:00 to 6:00 on the next day than that in the secondary battery management device according to the second comparative example.

Figure 5:
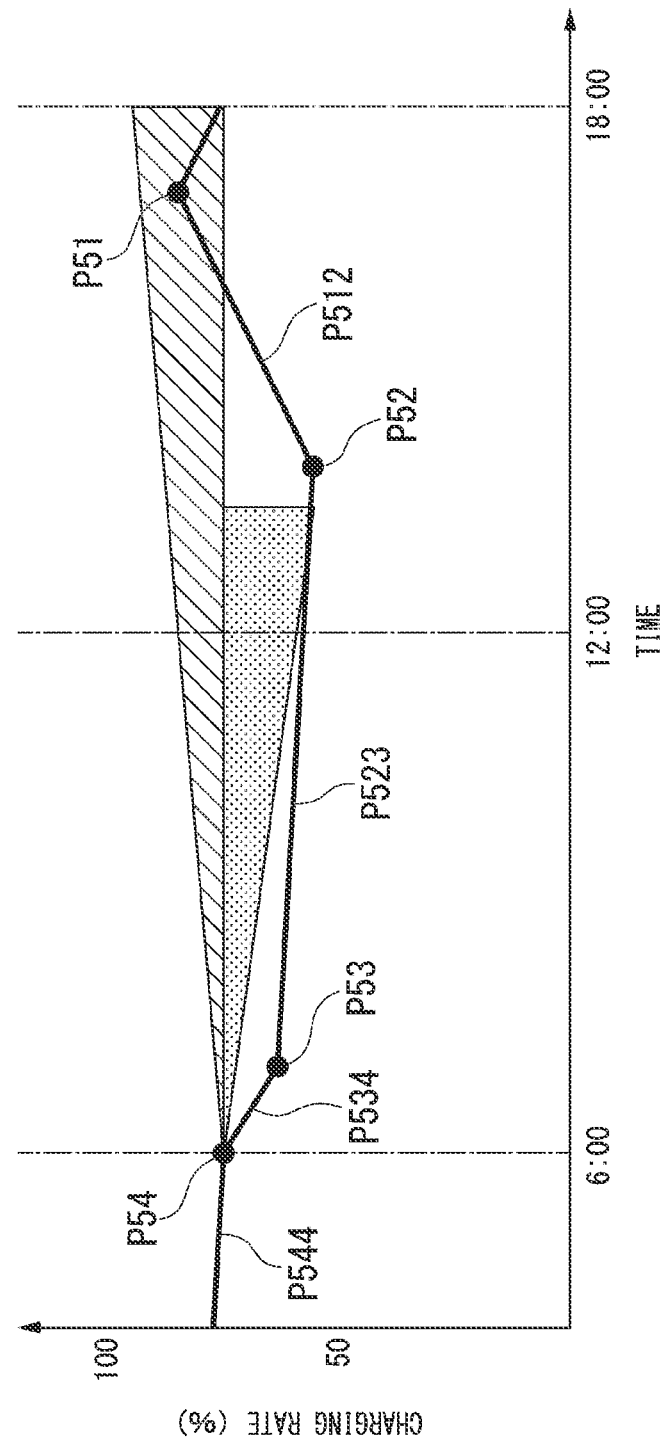
FIG. 5 is a view illustrating an example of scheduling in which the charging rate of the secondary battery changes over time when setting is performed such that discharging is executed after the main charging start time.

Next, a third example of scheduling in which the charging rate of the secondary battery according to the embodiment changes over time will be described with reference to FIG. 5. FIG. 5 is a view illustrating an example of scheduling in which the charging rate of the secondary battery changes over time when setting is performed such that the discharging is executed after the main charging start time. The vehicle according to the third example indicated in FIG. 5 is a vehicle in which a solar power generation panel for supplying electricity to the secondary battery is mounted.

FIG. 5 illustrates an example of a case in which the user goes to work using the vehicle at 6:00, the vehicle is brought to a stop from 6:00 to around 17:00, and the user leaves work using the vehicle at 17:30. In FIG. 5, the horizontal axis indicates the time, and the vertical axis indicates the charging rate. Moreover, in FIG. 5, the amount of increase in the charging rate due to the main charging is indicated by a triangular shape subjected to oblique hatching, and the amount of reduction in the charging rate due to the discharging is indicated by a triangular shape subjected to dotted hatching. The solid line indicated in FIG. 5 is constituted of a point P51, a point P52, a point P53, a point P54, a segment L512, a segment L523, a segment L534, and a segment L544 and indicates virtual changes in amount of the secondary battery when it is assumed that the main charging is executed after the discharging.

The coordinate on the horizontal axis of the point P51 indicates 17:30 that is an example of the target charging rate reaching time. The coordinate on the vertical axis of the point P51 indicates 95% that is an example of the target charging rate. The coordinates of the point P51 are set by the target setting portion 102.

The coordinate on the horizontal axis of the point P54 indicates 6:00 that is an example of the main charging start time and the discharging start time. The coordinate on the vertical axis of the point P54 indicates the charging rate of the secondary battery at the main charging start time and the discharging start time. As indicated by a triangular shape subjected to oblique hatching in FIG. 5, the main charging is started at 6:00. On the other hand, as indicated by a triangular shape subjected to dotted hatching in FIG. 5, the discharging is started at 6:00. Further, when it is assumed that the main charging is executed after the discharging, the charging rate of the secondary battery makes changes in amount as indicated by the solid line in FIG. 5.

The coordinate on the horizontal axis of the point P52 indicates a virtual main charging start time. The coordinate on the vertical axis of the point P52 indicates the charging rate of the secondary battery at the virtual main charging start time. In the segment L512, one end coincides with the point P51, and the other end coincides with the point P52. The inclination of the segment L512 indicates a virtual main charging speed. The coordinate on the horizontal axis of the point P53 indicates an example of a virtual discharging start time. The coordinate on the vertical axis of the point P53 indicates the charging rate of the secondary battery at the virtual discharging start time.

In the segment L523, one end coincides with the point P52, and the other end coincides with the point P53. The inclination of the segment L523 indicates the discharging speed of the discharging due to self-discharging of the secondary battery. Therefore, the coordinates of the point P52 are determined by the target charging rate reaching time and the target charging rate set by the target setting portion 102, the virtual main charging start time and the main charging speed set by the main charging setting portion 103, the virtual discharging start time set by the discharging setting portion 105, and the charging rate of the secondary battery at the virtual discharging start time.

The segment L534 indicates an example of change in the charging rate over time due to the discharging of the secondary battery caused while the vehicle is traveling. The segment L544 indicates an example of change in the charging rate over time due to self-discharging of the secondary battery while the vehicle is brought to a stop.

Figure 6:
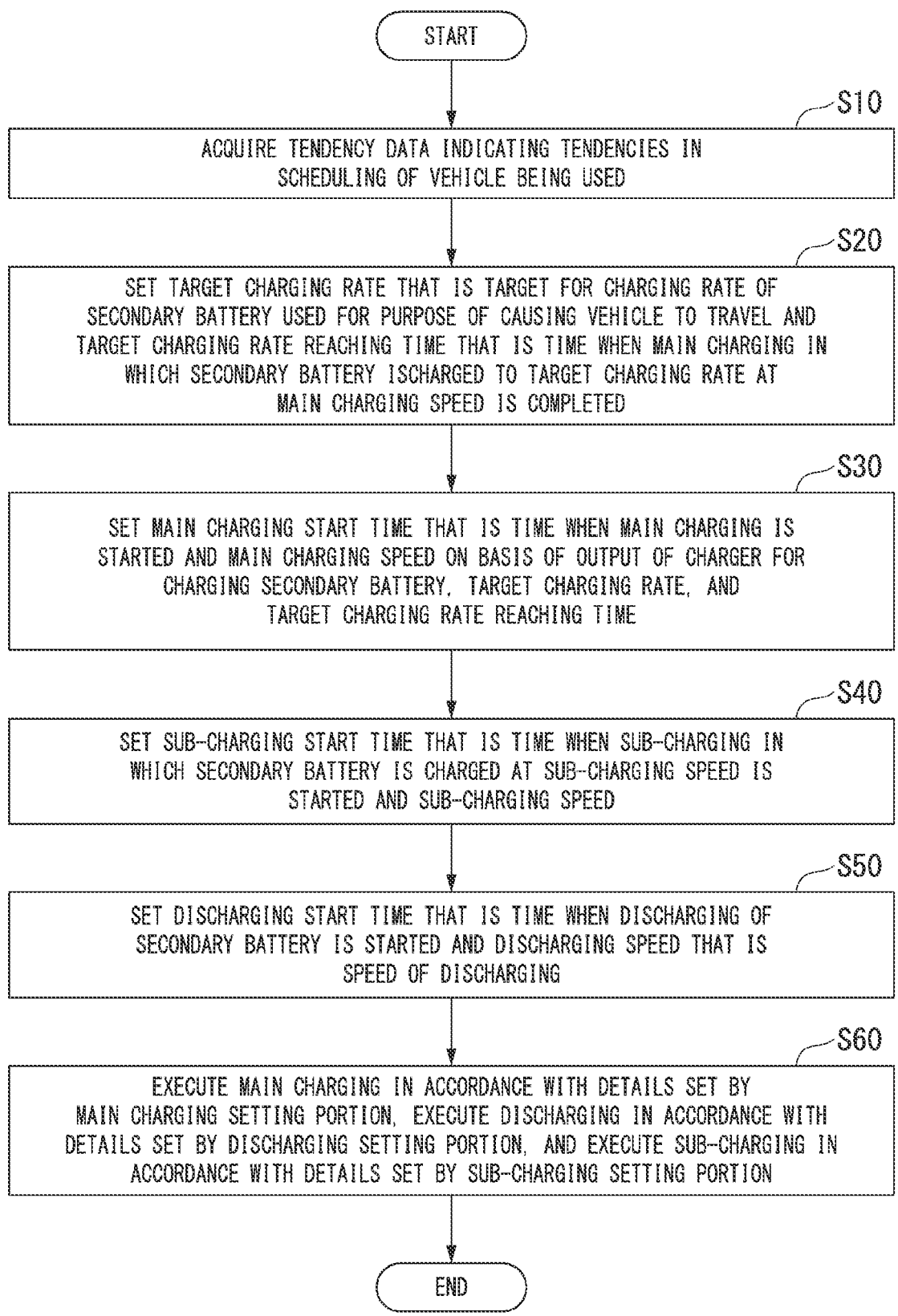
FIG. 6 is a flowchart showing an example of processing executed by the secondary battery management device according to the embodiment.

Next, with reference to FIG. 6, processing executed by the secondary battery management device according to the embodiment will be described. FIG. 6 is a flowchart showing an example of processing executed by the secondary battery management device according to the embodiment.

In Step S10, the tendency data acquiring portion 101 acquires the tendency data indicating tendencies in scheduling of the vehicle being used.

In Step S20, the target setting portion 102 sets the target charging rate that is a target for the charging rate of the secondary battery used for the purpose of causing the vehicle to travel and the target charging rate reaching time that is a time when the main charging in which the secondary battery is charged to the target charging rate at the main charging speed is completed.

In Step S30, the main charging setting portion 103 sets the main charging start time that is a time when the main charging is started and the main charging speed on the basis of an output of the charger for charging the secondary battery, the target charging rate, and the target charging rate reaching time.

In Step S40, the sub-charging setting portion 104 sets the sub-charging start time that is a time when the sub-charging in which the secondary battery is charged at the sub-charging speed is started and the sub-charging speed.

In Step S50, the discharging setting portion 105 sets the discharging start time that is a time when the discharging of the secondary battery is started and the discharging speed that is a speed of the discharging.

In Step S60, the charging/discharging execution portion 107 executes the main charging in accordance with details set by the main charging setting portion 103, executes the discharging in accordance with details set by the discharging setting portion 105, and executes the sub-charging in accordance with details set by the sub-charging setting portion 104.

Hereinabove, the vehicle and the secondary battery management device 1 according to the embodiment have been described. The secondary battery management device 1 includes at least one of the target setting portion 102, the main charging setting portion 103, the discharging setting portion 105, and the sub-charging setting portion 104; and the charging/discharging execution portion 107.

The target setting portion 102 sets the target charging rate that is a target for the charging rate of the secondary battery used for the purpose of causing the vehicle to travel and the target charging rate reaching time that is a time when the main charging in which the secondary battery is charged to the target charging rate at the main charging speed is completed. The main charging setting portion 103 sets the main charging start time that is a time when the main charging is started and the main charging speed on the basis of an output of the charger for charging the secondary battery, the target charging rate, and the target charging rate reaching time.

The discharging setting portion 105 sets the discharging start time that is a time when the discharging of the secondary battery is started and the discharging speed that is a speed of the discharging. The sub-charging setting portion 104 sets the sub-charging start time that is a time when the sub-charging in which the secondary battery is charged at the sub-charging speed is started and the sub-charging speed. The charging/discharging execution portion 107 executes the main charging in accordance with details set by the main charging setting portion 103, executes the discharging in accordance with details set by the discharging setting portion 105, and executes the sub-charging in accordance with details set by the sub-charging setting portion 104.

Namely, in the secondary battery management device 1, at least one of processing of decreasing the charging rate of the secondary battery by executing the discharging and processing of comparatively gently raising the charging rate of the secondary battery by executing the sub-charging, and processing of comparatively quickly raising the charging rate of the secondary battery by executing the main charging are used together.

Accordingly, in the secondary battery management device 1, while an average charging rate during a period from the earliest time of the main charging start time, the sub-charging start time, and the discharging start time to the target charging rate reaching time is maintained at a comparatively low charging rate, the charging rate of the secondary battery at the target charging rate reaching time is adopted as the target charging rate. Therefore, in the secondary battery management device 1, while deterioration of the secondary battery mounted in the vehicle is curbed, the charging rate of the secondary battery when the vehicle is used can meet a desired charging rate.

In the secondary battery management device 1, setting is performed such that the sub-charging is executed before the main charging start time. Accordingly, in the secondary battery management device 1, while the average charging rate during a period from the sub-charging start time to the target charging rate reaching time is maintained at a comparatively low charging rate, preparation for adopting the charging rate of the secondary battery at the target charging rate reaching time as the target charging rate can be arranged.

In the secondary battery management device 1, setting is performed such that the discharging is executed before the main charging start time. Accordingly, in the secondary battery management device 1, while the average charging rate during a period from the discharging start time to the target charging rate reaching time is maintained at a comparatively low charging rate, preparation for adopting the charging rate of the secondary battery at the target charging rate reaching time as the target charging rate can be arranged.

In the secondary battery management device 1, setting is performed such that the discharging is executed after the main charging start time. Accordingly, in the secondary battery management device 1, the charging rate of the secondary battery can be raised in accordance with the period from the main charging start time to the target charging rate reaching time, and the charging rate of the secondary battery at the target charging rate reaching time can be adopted as the target charging rate.

In the secondary battery management device 1, the quantity of electricity allowed for main charging that is a quantity of electricity allowed for the main charging with respect to the secondary battery is calculated on the basis of the tendency data, and the main charging start time and the main charging speed are set on the basis of the quantity of electricity allowed for main charging. Moreover, in the secondary battery management device 1, the quantity of electricity allowed for sub-charging that is a quantity of electricity allowed for the sub-charging with respect to the secondary battery is calculated on the basis of the tendency data, and the sub-charging start time and the sub-charging speed are set on the basis of the quantity of electricity allowed for sub-charging.

Accordingly, in the secondary battery management device 1, the main charging start time, the main charging speed, the sub-charging start time, and the sub-charging speed are set on the basis of the tendency data indicating tendencies in scheduling of the vehicle being used. Accordingly, in the secondary battery management device 1, the main charging and the sub-charging can be executed in accordance with the tendencies in scheduling of the vehicle being used.

In the secondary battery management device 1, the quantity of electricity allowed for discharging that is a quantity of electricity allowed for the discharging is calculated on the basis of the quantity of electricity allowed for main charging and the quantity of electricity allowed for sub-charging, and the discharging start time and the discharging speed are set on the basis of the quantity of electricity allowed for discharging. Accordingly, in the secondary battery management device 1, the discharging can be executed in accordance with the tendencies in scheduling of the vehicle being used.

In the secondary battery management device 1, setting is performed such that the discharging is prohibited when it is judged that someone is present inside the compartment of the vehicle. Accordingly, in the secondary battery management device 1, a situation in which a person inside the compartment of the vehicle cannot use in-vehicle instruments operated by utilizing electricity of the secondary battery can be avoided.

In the secondary battery management device 1, when the charging rate of the secondary battery exceeds the predetermined threshold after discharging is prohibited, setting for prohibiting the discharging of the secondary battery is canceled. Accordingly, in the secondary battery management device 1, even if there is a likelihood that a person inside the compartment of the vehicle will use in-vehicle instruments operated by utilizing electricity of the secondary battery, when the charging rate of the secondary battery is sufficiently high, the charging rate of the secondary battery can be decreased by suitably executing the discharging, and deterioration of the secondary battery can be curbed.

In the secondary battery management device 1, setting is performed such that electricity output from the secondary battery through the discharging is utilized for at least one of warming of the secondary battery, cooling of the secondary battery, air conditioning inside the compartment of the vehicle, and heating of oil of the vehicle. Accordingly, in the secondary battery management device 1, electricity output from the secondary battery through the discharging can be effectively utilized.

In the secondary battery management device 1, when electricity generated by the solar power generation panel is accumulated in the secondary battery, processing of setting the main charging start time and the main charging speed is executed at least once on the basis of changes in amount of electricity generated by the solar power generation panel. Accordingly, in the secondary battery management device 1, even if there is a likelihood that electricity generated by the solar power generation panel will fluctuate due to climate change or the like, the main charging start time and the main charging speed can be suitably revised on the basis of results of electricity generated by the solar power generation panel.

The tendency data acquiring portion 101 may acquire the tendency data indicating a first period that is a period during which the vehicle is not used for traveling, a second period that is a period during which the vehicle is used for traveling and which is subsequent to the first period, and a third period that is a period during which the vehicle is not used for traveling and which is subsequent to the second period. In this case, the target setting portion 102 sets the target charging rate reaching time at the end of the first period and sets the target charging rate to a charging rate equal to or higher than a charging rate required for the vehicle to travel during the second period. Accordingly, in the secondary battery management device 1, when the vehicle is used during the second period, the secondary battery can be in a state in which sufficient electricity can be supplied to the vehicle.

The tendency data acquiring portion 101 may acquire the tendency data indicating a first period that is a period during which the vehicle is not used for traveling, a second period that is a period during which the vehicle is used for traveling and which is subsequent to the first period, and a third period that is a period during which the vehicle is not used for traveling and which is subsequent to the second period. In this case, accordingly, in the secondary battery management device 1, when the second period between the first period that is a period during which the vehicle is not used for traveling and the third period is comparatively short, the processing described above can be executed regardless of the second period, and the secondary battery can be in a state in which sufficient electricity can be supplied to the vehicle at the end of the third period. Hereinabove, the embodiment of the present invention has been described with reference to the drawings. However, the secondary battery management device, the secondary battery management program and the secondary battery management method are not limited to the embodiment described above, and at least one of various modifications, replacements, combinations, and design changes can be added thereto within a range not departing from the gist of the present invention.

The effects of the embodiment of the present invention described above are effects which have been described as examples. Therefore, in addition to the effects described above, the embodiment of the present invention can also exhibit other effects which can be recognized from the description of the foregoing embodiment by those skilled in the art.

What is claimed is:

1. A secondary battery management device, comprising:
   a target setting portion that sets a target charging rate that is a target for a charging rate of a secondary battery used for the purpose of causing a vehicle to travel and a target charging rate reaching time that is a time when main charging in which the secondary battery is charged to the target charging rate at a main charging speed is completed;
   a main charging setting portion that sets a main charging start time that is a time when the main charging is started and the main charging speed on the basis of an output of a charger for charging the secondary battery, the target charging rate, and the target charging rate reaching time;
   at least one of a discharging setting portion that sets a discharging start time that is a time when discharging of the secondary battery is started and a discharging speed that is a speed of the discharging, and a sub-charging setting portion that sets a sub-charging start time that is a time when sub-charging in which the secondary battery is charged at a sub-charging speed is started and the sub-charging speed;
   a charging/discharging execution portion that executes the main charging in accordance with details set by the main charging setting portion, executes the discharging in accordance with details set by the discharging setting portion, and executes the sub-charging in accordance with details set by the sub-charging setting portion; and
   a tendency data acquiring portion that acquires tendency data indicating tendencies in scheduling of the vehicle being used,
   wherein the main charging setting portion calculates a quantity of electricity allowed for main charging that is a quantity of electricity allowed for the main charging with respect to the secondary battery on the basis of the tendency data and sets the main charging start time and the main charging speed on the basis of the quantity of electricity allowed for main charging, and
   wherein the sub-charging setting portion calculates a quantity of electricity allowed for sub-charging that is a quantity of electricity allowed for the sub-charging with respect to the secondary battery on the basis of the tendency data and sets the sub-charging start time and the sub-charging speed on the basis of the quantity of electricity allowed for sub-charging.

2. The secondary battery management device according to claim 1,
   wherein the sub-charging setting portion is set such that the sub-charging is executed before the main charging start time.

3. The secondary battery management device according to claim 1,
   wherein the discharging setting portion is set such that the discharging is executed before the main charging start time.

4. The secondary battery management device according to claim 1,
   wherein the discharging setting portion is set such that the discharging is executed after the main charging start time.

5. The secondary battery management device according to claim 1,
   wherein the discharging setting portion calculates a quantity of electricity allowed for discharging that is a quantity of electricity allowed for the discharging on the basis of the quantity of electricity allowed for main charging and the quantity of electricity allowed for sub-charging and sets the discharging start time and the discharging speed on the basis of the quantity of electricity allowed for discharging.

6. The secondary battery management device according to claim 1,
   wherein the tendency data acquiring portion acquires the tendency data indicating a first period that is a period during which the vehicle is not used for traveling, a second period that is a period during which the vehicle is used for traveling and which is subsequent to the first period, and a third period that is a period during which the vehicle is not used for traveling and which is subsequent to the second period, and wherein the target setting portion sets the target charging rate reaching time to an end of the first period and sets the target charging rate to a charging rate equal to or higher than a charging rate required for the vehicle to travel during the second period.

7. The secondary battery management device according to claim 1, wherein the tendency data acquiring portion acquires the tendency data indicating a first period that is a period during which the vehicle is not used for traveling, a second period that is a period during which the vehicle is used for traveling and which is subsequent to the first period, and a third period that is a period during which the vehicle is not used for traveling and which is subsequent to the second period, and wherein the target setting portion sets the target charging rate to a charging rate equal to or higher than a predetermined charging rate and sets the target charging rate reaching time to an end of the third period.

8. The secondary battery management device according to claim 1 further comprising:

a judging portion that judges whether or not anyone is present inside a compartment of the vehicle, wherein the discharging setting portion performs setting such that the discharging is prohibited when it is judged that someone is present inside the compartment of the vehicle.

9. The secondary battery management device according to claim 8, wherein the discharging setting portion cancels setting for prohibiting discharging of the secondary battery when the charging rate of the secondary battery exceeds a predetermined threshold after the discharging is prohibited.

10. The secondary battery management device according to claim 1, wherein the discharging setting portion performs setting such that electricity output from the secondary battery through the discharging is utilized for at least one of warming of the secondary battery, cooling of the secondary battery, air conditioning inside the compartment of the vehicle, and heating of oil of the vehicle.

11. The secondary battery management device according to claim 1, wherein electricity generated by a solar power generation panel is accumulated in the secondary battery, and wherein the main charging setting portion executes processing of setting the main charging start time and the main charging speed at least once on the basis of changes in amount of electricity generated by the solar power generation panel.

12. The secondary battery management device according to claim 11, wherein the solar power generation panel is mounted in the vehicle.

13. A computer readable non-transitory storage medium that stores a secondary battery management program for causing a computer to execute:

a target setting function of setting a target charging rate that is a target for a charging rate of a secondary battery used for the purpose of causing a vehicle to travel and of setting a target charging rate reaching time, that is a time when main charging in which the secondary battery is charged to the target charging rate at a main charging speed, is completed;

a main charging setting function of setting a main charging start time that is a time when the main charging is started and the main charging speed on the basis of an output of a charger for charging the secondary battery, the target charging rate, and the target charging rate reaching time;

at least one of a discharging setting function of setting a discharging start time that is a time when discharging of the secondary battery is started and a discharging speed that is a speed of the discharging, and a sub-charging setting function of setting a sub-charging start time that is a time when sub-charging in which the secondary battery is charged at a sub-charging speed is started and the sub-charging speed;

a charging/discharging execution function of executing the main charging in accordance with details set by the main charging setting function, executing the discharging in accordance with details set by the discharging setting function, and executing the sub-charging in accordance with details set by the sub-charging setting function; and a tendency data acquiring function of acquiring tendency data indicating tendencies in scheduling of the vehicle being used, wherein the main charging setting function comprises calculating a quantity of electricity allowed for main charging that is a quantity of electricity allowed for the main charging with respect to the secondary battery on the basis of the tendency data and sets the main charging start time and the main charging speed on the basis of the quantity of electricity allowed for main charging, and wherein the sub-charging setting function calculates a quantity of electricity allowed for sub-charging that is a quantity of electricity allowed for the sub-charging with respect to the secondary battery on the basis of the tendency data and sets the sub-charging start time and the sub-charging speed on the basis of the quantity of electricity allowed for sub-charging.

14. A secondary battery management method in which a computer:

sets a target charging rate that is a target for a charging rate of a secondary battery used for the purpose of causing a vehicle to travel and a target charging rate reaching time that is a time when main charging in which the secondary battery is charged to the target charging rate at a main charging speed is completed;

sets a main charging start time that is a time when the main charging is started and the main charging speed on the basis of an output of a charger for charging the secondary battery, the target charging rate, and the target charging rate reaching time;

executes at least one of processing of setting a discharging start time that is a time when discharging of the secondary battery is started and a discharging speed that is a speed of the discharging, and processing of setting a sub-charging start time that is a time when sub-charging in which the secondary battery is charged at a sub-charging speed is started and the sub-charging speed;

executes the main charging in accordance with set details, executes the discharging in accordance with set details, and executes the sub-charging in accordance with set details;

acquires tendency data indicating tendencies in scheduling of the vehicle being used;

calculates a quantity of electricity allowed for main charging that is a quantity of electricity allowed for the main charging with respect to the secondary battery on the basis of the tendency data and sets the main charging start time and the main charging speed on the basis of the quantity of electricity allowed for main charging; and calculates a quantity of electricity allowed for sub-charging that is a quantity of electricity allowed for the sub-charging with respect to the secondary battery on the basis of the tendency data and sets the sub-charging start time and the sub-charging speed on the basis of the quantity of electricity allowed for sub-charging.

* * * * *